United States Patent [19]

Suter

[11] Patent Number: 4,598,883

[45] Date of Patent: Jul. 8, 1986

[54] APPARATUS FOR PROTECTING A PORTION OF THE EXTERIOR OF AN AIRCRAFT

[76] Inventor: William L. Suter, 2618 - 15th Ave., Moline, Ill. 61265

[21] Appl. No.: 578,961

[22] Filed: Feb. 10, 1984

[51] Int. Cl.$^4$ ............................................. B64D 47/00
[52] U.S. Cl. ................................. 244/1 R; 150/52 R
[58] Field of Search ............ 244/1 R; 150/52 R, 52 K

[56] References Cited

U.S. PATENT DOCUMENTS

| | | | |
|---|---|---|---|
| 2,526,389 | 10/1950 | Montefalco | 244/1 R |
| 3,044,516 | 7/1962 | Stoll | 150/52 R |
| 3,665,355 | 5/1972 | Sasaki et al. | 150/52 K |
| 3,763,908 | 10/1973 | Norman | 150/52 K |
| 3,815,650 | 6/1974 | Hickey | 244/1 R |
| 4,041,999 | 8/1977 | Miller | 150/52 K |

Primary Examiner—Galen Barefoot
Attorney, Agent, or Firm—Seed and Berry

[57] ABSTRACT

Apparatus is disclosed for protecting the exterior of an aircraft which comprises a plurality of elastomeric foam members; each substantially in the form of a sheet for covering a respective portion of the exterior of the aircraft. The invention additionally comprises straps for removably attaching the foam members to their respective portions of the exterior of the aircraft and air spaces for preventing moisture from building up between the foam members and their respective portions of the exterior surface of the aircraft.

11 Claims, 8 Drawing Figures

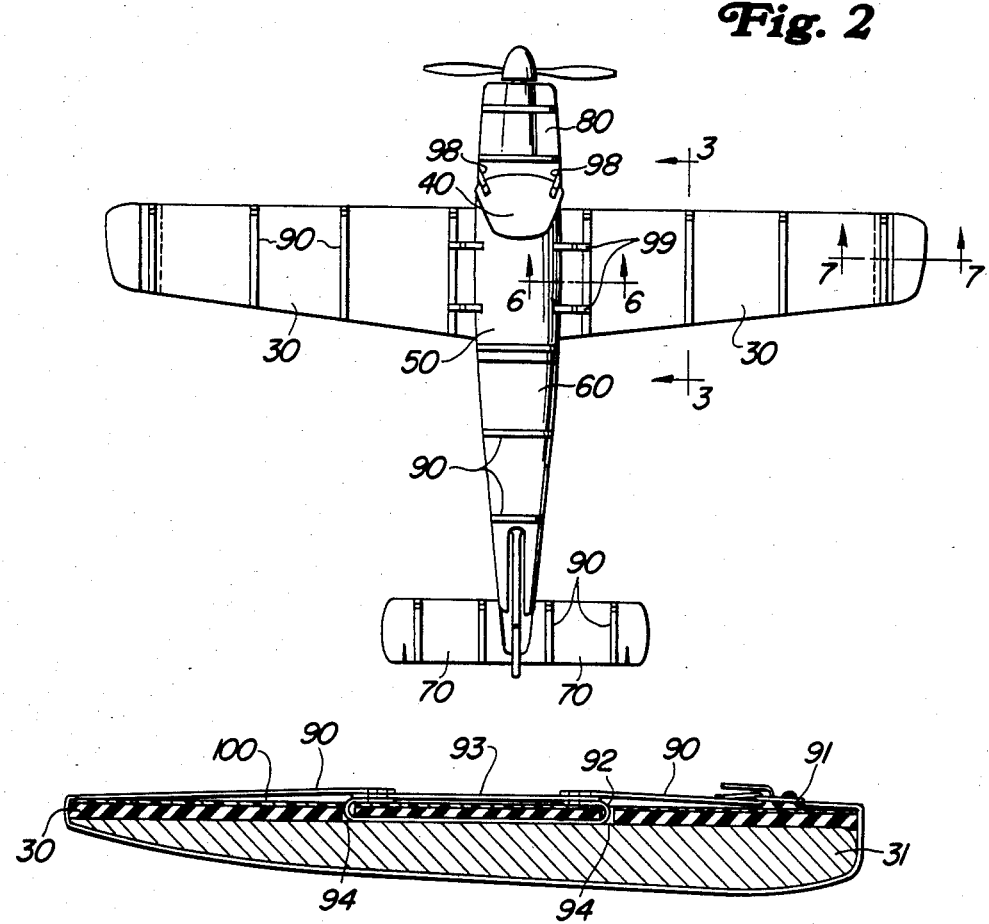
Fig. 2
Fig. 3
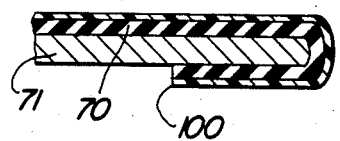
Fig. 5
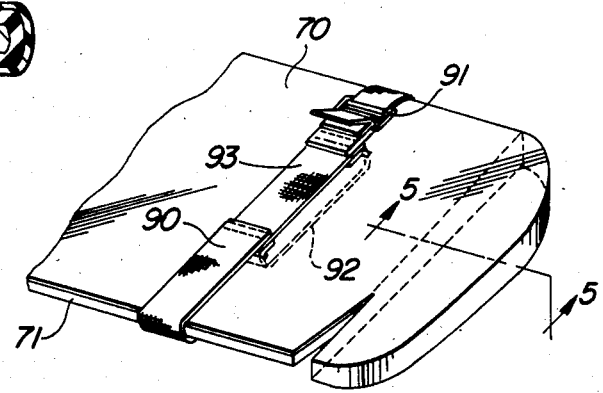
Fig. 4

APPARATUS FOR PROTECTING A PORTION OF THE EXTERIOR OF AN AIRCRAFT

BACKGROUND OF THE INVENTION

1. Field of the Invention

This invention relates generally to apparatus for protecting a portion of the exterior of an aircraft and, more particularly, pertains to apparatus which is comprised primarily of sheets of elastomeric foam which are removably attachable to the upper surfaces of the exterior of aircraft, particularly those fixed-wing aircraft utilized in general aviation.

2. Description of the Prior Art

Owners and operators of aircraft face a substantial problem protecting the exterior surfaces said aircraft when they are parked or "tied down". Common practice is to tie an aircraft down within a building or hanger to protect said aircraft from the elements, including wind, rain, hail, snow, dirt and damaging ultraviolet light. However, owners and operators of aircraft often find themselves unable to acquire adequate hangar space due to increasing costs or unavailability of such space. Moreover, hanger space is not generally available where the aircraft is taken from its ordinary base of operations to airports and airstrips remote therefrom.

Owners and operators have devised means for protecting their aircraft including canvass or plastic covers. These means do not provide protection from impact from hail which is a substantial problem in those locations of the United States, such as the Midwest, that experience frequent hail storms.

Therefore, it is desirable to provide apparatus which permits easy installation and removal of means for protecting a portion of the exterior of an aircraft, especially those portions of the exterior which are directly exposed to the elements. Furthermore, it is desirable to provide such apparatus that protects the exterior of the aircraft from impact such as that occurring during a hail storm.

Finally, it is desirable to provide such apparatus for protecting the exterior of aircraft that can be easily stored within the aircraft with due consideration to the weight and size limitations of said aircraft.

SUMMARY OF THE INVENTION

Therefore, it is provided in the practice of this invention according to a presently preferred embodiment apparatus for protecting a portion of the exterior of an aircraft comprising at least one elastomeric foam member substantially in the form of a sheet for covering a portion of the exterior of said aircraft. Said apparatus additionally comprises at least one strap means associated with each foam member for removably attaching said foam member to a portion of the exterior surface of said aircraft.

Preferably, the shape and dimension of each elastomeric foam sheet is selected to cover a portion of the exterior of the aircraft which is directly exposed to the elements such as a top of the wings, the cockpit, the top of the fuselage, engine cowl, horizontal stabilizer and vertical tail and rudder. Moreover, it is desirable to provide strap means which allow the interconnection of said elastomeric foam sheets to provide additional means for removably securing said apparatus to the aircraft.

BRIEF DESCRIPTION OF THE DRAWINGS

These and other features and advantages of the present invention will be better understood by reference to the following detailed description when considered in connection with the accompanying drawings wherein:

FIG. 2 is a plan view of the aircraft shown in FIG. 1;

FIG. 3 is a cross section on line 3—3 of FIG. 2 through a portion of a wing of the aircraft;

FIG. 4 is a perspective view of the apparatus covering a portion of the horizontal stabilizer of the aircraft;

FIG. 5 is a cross section on line 5—5 of the apparatus shown in FIG. 4;

DESCRIPTION OF THE PREFERRED EMBODIMENTS

Figure 1:
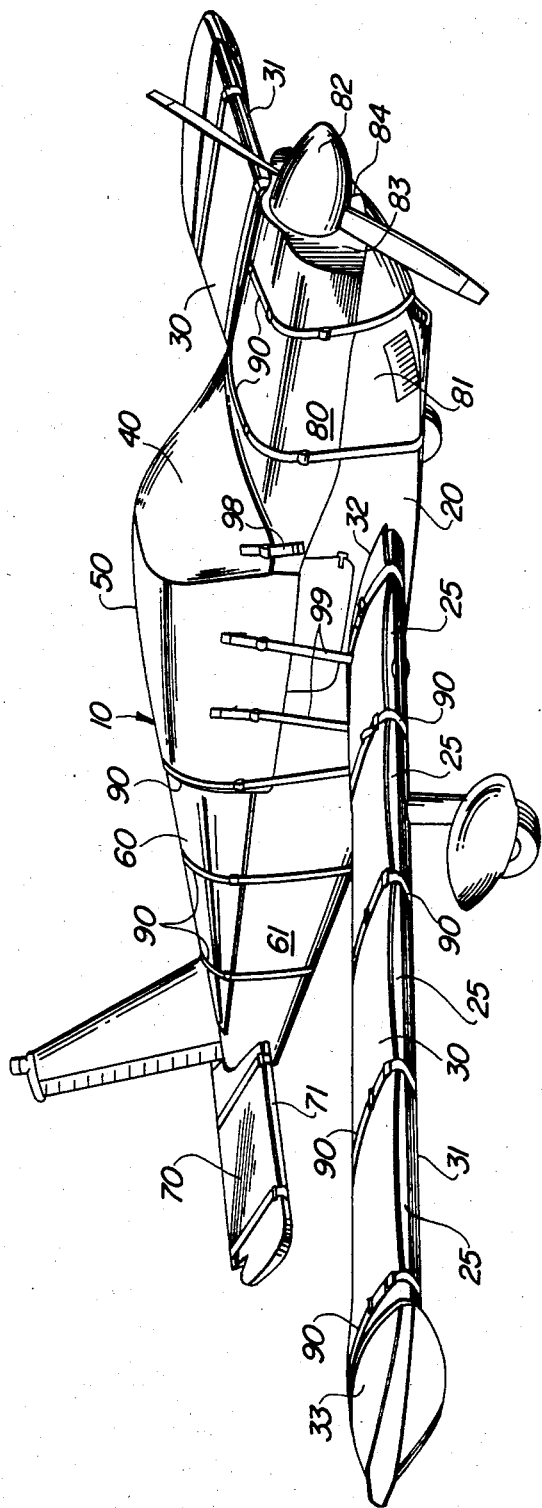
FIG. 1 is a perspective view of an aircraft illustrating the apparatus for protecting a portion of the exterior of said aircraft constructed according to the principles of this invention.
Figure 6:
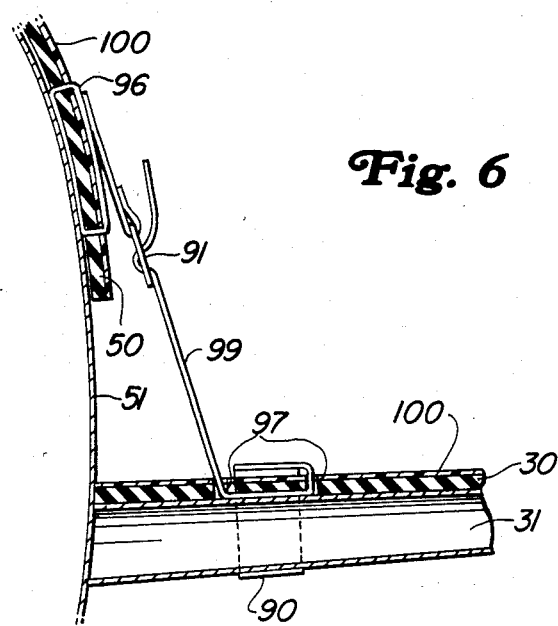
FIG. 6 is a cross section on line 6—6 of FIG. 5 through the wing root of the aircraft.

FIGS. 1, 2, 3, 4, 5, 6 and 7 illustrate a preferred embodiment of the apparatus 10 constructed according to the principles of this invention. This preferred embodiment is shown utilized in conjunction with a typical modern low-wing, single engine two or four place aircraft 20. It is contemplated that other embodiments of this invention fall within its scope for applications utilized on multiple-engine aircraft, high-wing aircraft, turboprop and jet aircraft. Moreover, it is anticipated that embodiments of this invention could be adapted to protect the exterior of rotorcraft.

Elastomeric foam as used herein includes open cell and closed cell materials preferably constructed from styrene-butadiene rubbers, natural rubbers, cis-polybutadiene rubbers, cis-polyisoprene rubbers, ethylene-propylene rubbers, butyl rubbers, polyacrylates, polysulfide rubbers, silicones, fluorocarbons, neoprene, nitrile rubbers, polyurethanes and other elastomers. Moreover, said elastomeric foams may comprise combinations of any and all of the aforementioned elastomers.

Sheets of elastomeric foam 30, 40, 50, 60, 70 and 80 are cut from roll or other stock to have dimensions approximating the surfaces of the aircraft 10 to be protected. Specifically, wing covers 30 cover the upper surface of each wing 31 from the wing root 32 to the vicinity of the wing tip 33 and from the leading to trailing edges of the wing 31. Preferably Armstrong (Lancaster Pa.) Armaflex ™ sheet insulation having a one-quarter inch thickness is utilized.

In the preferred embodiment, the elastomeric foam sheets 30, 40, 50, 60, 70 and 80 are covered with a fiberglass fabric 100. Additionally, the preferred embodiment contemplates utilization of a silicone rubber to impregnate said fiberglass fabric 100. Preferably Southern Textile (Charlotte, N.C.) #2300 silicone impregnated fiberglass is utilized.

The color of the silicone rubber impregnated fiberglass fabric is selected to maximally reflect ultraviolet light which is damaging to most aircraft exterior finishes and also upholstery, instruments and radios. Preferably the color is silver or white.

Alternatively, the elastomeric foam sheet may be dipped in a plasticizer which results in a smooth, durable finish. Other alternative embodiments include a spray finish which is applied to the elastomeric foam by means of spraying. Finally, fabrics other than fiberglass may be employed where specific conditions and economic considerations dictate.

Figure 7:
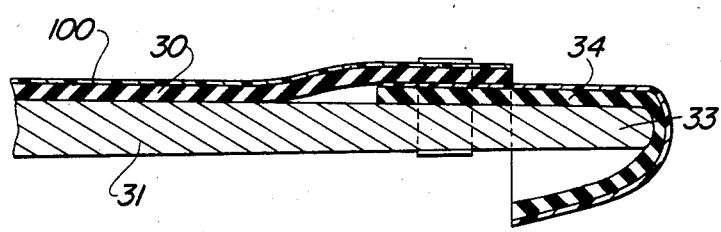
FIG. 7 is a cross section on line 7—7 of FIG. 6 through a wing tip of the aircraft.

In the vicinity of the wing tip 33, the wing sheet 30 overlaps a wing tip sheet 34 (FIG. 7). Said wing tip sheet 34 is also covered with the silicone rubber impregnated fiberglass cloth 100. At the point of overlap between the wing sheet 30 and the tip sheet 33, adhesive is applied to bond said sheets together at the region of overlap. Said arrangement provides protection for the wing tip 33 from mechanical damage and impact.

The preferred adhesive is Armstrong (Lancaster, Pa.) 520 TM adhesive. The wing tip sheet 34 is preferably dimensioned so that it extends around the wing tip 33 forming an envelope to cover said wing tip 33. The envelope is formed by bonding the edges of the portion of the wing tip 34 with the edges of said sheet disposed on top of the wing tip 33.

Disposed along the longitudinal axis of each wing 31 is a plurality of straps 90. Said straps are preferably fabricated from cotton or nylon webbing or the like. Additionally, each strap has a buckle 91 attached at one end of the strap. Said attachment may be had by adhesively bonding, sewing or riveting the end of the strap to itself, thus forming a loop for permanently retaining the buckle 91.

In the preferred embodiment, each strap 90 is affixed to its associated sheet 30, 40, 50, 60, 70 and 80 by means of an anchor element 92 and a bridging element 93 (FIG. 3). The anchor 92 and bridging 93 elements are preferably constructed from the same or similar material as the strap 90.

The anchor element 92 has each end passing through slotted openings 94 defined by the appropriate foam sheet 30, 40, 50, 60, 70 and 80. Said slots 94 have a length sufficient to allow the width of the anchor element 92 to easily pass therethrough. Additionally, said slots 94 have a width sufficient to allow the thickness of the anchor element 92 to easily pass therethrough. Each end of the anchor element 92 is suitably affixed to the bridging element 93 by means of adhesive or stitching. In turn, the strap 90 is affixed to the bridging element 93 by adhesive or stitching.

This arrangement provides maximal strength at the point of attachment between the strap 90 and the foam sheet 30, 40, 50, 60, 70 and 80. The anchor 92 and bridging elements affectively provide means for anchoring the straps 90 to the foam sheets with minimal distortion and tearing of the foam. The strap 90 may be continuous at the point of attachment to the bridging elements 93 or alternatively may comprise two pieces having one end of each attached to a respective end of the bridging element 93.

The top of the fuselage 61 can be covered by foam sheet 60. Said sheet 60 is removably affixed to the fuselage 61 by means of straps 90. Said straps 90 are affixed to the fuselage sheet 60 in a manner identical to that for affixing the straps 90 to the wing sheets 30 as previously discussed.

The horizontal stabilizer 71 is covered with two sheets of elastomeric foam 70 each extending from the vertical tail and rudder to one tip of the horizontal stabilizer 71. At the tip of the horizontal stabilizer 71, the horizontal stabilizer sheet 70 folds over the end of the tip to form a pocket (FIGS. 4 and 5). Said arrangement provides protection for the tip of the horizontal stabilizer 71 from mechanical damage and impact. Each stabilizer sheet 70 is removably attached to the horizontal stabilizer 71 by means of one or more straps 90. Said straps 90 are affixed to the stabilizer sheet 70 in a fashion described above for attachment of the straps 90 to the wing sheets 30.

The cowl 81 is covered with a cowl elastomeric foam sheet 80 which extends from the propeller spinner 82 to the base of the windshield (not shown). One or more straps 90 are utilized to removably attach said cowl sheet 80 to the aircraft 20. Said straps 90 are affixed to the cowl sheet 80 in a fashion identical to that utilized for affixing the straps 90 to wing sheets 30. Said cowl sheet 80 provides additional protection for the aircraft 20 in that it covers various engine air intake openings (not shown) thus preventing birds from nesting in the engine compartment and dirt and other foreign matter from entering while the aircraft is tied down.

A nose sheet 83 is adhesively attached to the edge of the cowl sheet 80 closest to the spinner 82. The nose sheet 83 separates along a parting line 84 to facilitate the combination of the cowl sheet and nose sheet 83. A strap (not shown) passes underneath the nose of the aircraft to assist in removably attaching said combination of cowl 80 and nose 83 sheets to the engine compartment of the aircraft 20.

The cockpit and windshield are covered with a combination cockpit sheet 50 and windshield sheet 40. Said cockpit sheet 50 overlaps said windshield sheet 40 and may be adhesively bonded thereto. Two or more straps 98 are provided to anchor the windshield sheet 40 to the cowl sheet 80. One end of each strap is affixed to the windshield sheet 40 and the other affixed to the cowl sheet 80. The method of affixing each end of the strap 98 is similar to that utilized for affixing the straps 90 to the wing sheets 30 except that the strap 98 does not extend beyond the point of attachment to the respective sheet 40 and 80.

The cockpit sheet 50 overlaps the fuselage sheet 60 may be adhesively bonded thereto and is removably attached to the aircraft 20 by means at least one strap 90 which is positioned in the region of overlap between the cockpit sheet and the fuselage sheet 60.

Each side of the cockpit sheet 50 is removably attached to the adjacent wing sheet 30 by means of one or more transverse straps 99. One end of the transverse strap 99 passes through on of two slotted openings 97 formed within the wing sheet 30. Said end then passes through the second opening and overlaps a wing sheet strap 90. At the point of overlap, the transverse strap 99 is stitched or otherwise adhesively attached to the wing strap 90. The other end of the strap 99 is stitched or otherwise adhesively affixed to a loop of strapping material passing through slotted openings formed within the cockpit sheet 50 to provide an anchor means for the end of the transverse strap.

The owner or operator of the aircraft 20 may conveniently store the elastomeric foam sheets 30, 40, 50, 60, 70 and 80 by rolling them and storing them in the storage compartment of the aircraft. The rolls may be stored in zipper bags or the like. When conditions warrant, the owner or operator of the aircraft unrolls the elastomeric sheets and installs them on the selected surfaces and removably attaches them to the aircraft by means of engaging the ends of the straps.

Because the elastomeric foam compresses underneath the strap, the elastomeric foam disposed between the straps is pulled away from the surface of the aircraft leaving a small airspace. Typical of these spaces 25 are shown on FIG. 1 along a leading edge of the wing 31. The spaces shown along the wing are only illustrative as they occur for each elastomeric sheet between the strap means for removably affixing them to the aircraft. The spaces provide adequate flow of air to prevent moisture buildup between the surface of the aircraft and the elastomeric foam sheet. This reduces the likelihood of damage to the surface of the aircraft from moisture accumulation.

Figure 8:
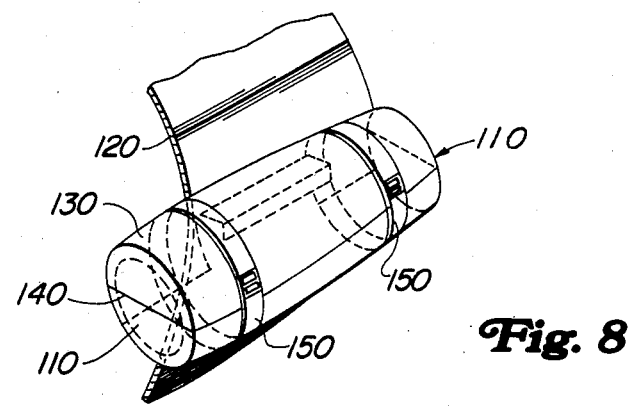
FIG. 8 is a perspective view illustrating an alternative embodiment of the invention used in conjunction with a jet aircraft engine.

An alternative embodiment is shown in FIG. 8 wherein the apparatus 100 is shown applied to a typical jet engine 110. The jet engine is attached to the fuselage or wing of an aircraft 120 in a conventional manner. An elastomeric sheet is formed into a tube 130 having sufficient diameter to surround the outer diameter of the essentially cylindrical jet engine 110. The ends of the tube 130 are optionally closed with additional pieces of elastomeric foam. The tube 130 is split along a parting line 140 along one side of the tube 130 and along the optional ends. Straps 150 are utilized for removably attaching the the cylindrical tube of elastomeric foam 130 around the jet engine 110.

The alternative embodiment shown in FIG. 8 is utilized by "opening" the cylindrical tube 130 and wrapping it around the jet engine 110. The straps 150 are removably affixed to the elastomeric tube 130 in a fashion identical to that described above for the attachment of the straps 90 to the associated elastomeric foam sheet. The straps 150 are then applied to removably attach the apparatus 100 to the jet aircraft to protect it from damage from impact from hail and other elements as well as preventing birds from nesting therein when the optional ends of the tube are installed.

The described embodiments of the invention are only considered to be preferred and illustrative of the inventive concept. The scope of the invention is not restricted to such embodiments. Various and numerous other arrangements may be devised by one skilled in the art without departing from the spirit or the scope of this invention. For example, it is contemplated that the shape and dimension of the elastomeric sheets constructed according to the principles of this invention may be varied in order to accommodate all types of fixed-wing aircraft and rotorcraft. Typically, covers for the propeller of the aircraft and the vertical tail and rudder may also be constructed from elastomeric foam sheets and strap means for removably attaching them thereto.

Additionally, it is anticipated that the range of thickness of the material may be varied to accommodate differing conditions of anticipated impact from hail and the like. Finally, it is anticipated that means other than straps may be utilized to removably attach the foam sheets to the aircraft. For example, elastic cords and the like may be utilized.

I claim:

1. Apparatus for protecting the exterior of an aircraft comprising:
a plurality of selectively interconnectable elastomeric foam members, each substantially in the form of a sheet covering a substantial portion of the exterior of said aircraft; and
strap means for removably attaching said foam members to their respective portions of the exterior of said aircraft; said strap means encircling said foam members and compressing a portion of said sheets, creating air spaces between said sheets and said exterior of said aircraft, said air spaces being disposed between adjacent strap means for preventing moisture accumulation between said sheet and said exterior of said aircraft.

2. The apparatus of claim 1 wherein the means for removably attaching said foam member comprises webbed straps having a buckle at one end.

3. The apparatus of claim 2 wherein the straps are affixed to the elastomeric foam members.

4. The apparatus of claim 1 wherein the means for removably attaching said foam members comprises elastic cords.

5. The apparatus of claim 1 wherein the elastomeric foam member has fabric adhesively attached to at least one surface thereof.

6. The apparatus of claim 5 wherein the fabric is fiberglass.

7. The apparatus of claim 6 wherein the fiberglass fabric is impregnated with silicone rubber.

8. The apparatus of claim 7 wherein the color of the silicone rubber impregnated fiberglass fabric is selected to maximally reflect ultraviolet light.

9. The apparatus of claim 1 wherein the elastomeric foam is comprised of open cell material constructed from an elastomer selected from the group consisting of styrene-butadiene rubbers, natural rubbers, cis-polybutadiene rubbers, cis-polyisoprene rubbers, ethylene-propylene rubbers, butyl rubbers, polyacrylates, polysulfide rubbers, silicones, fluorocarbons, neoprene, nitrile rubbers, and polyurethanes.

10. The apparatus of claim 1 wherein the elastomeric foam is comprised of closed cell material constructed from an elastomer selected from the group consisting of styrene-butadiene rubbers, natural rubbers, cis-polybutadiene rubbers, cis-polyisoprene rubbers, ethylene-propylene rubbers, butyl rubbers, polyacrylates, polysulfide rubbers, silicones, fluoroarbons, neoprene, nitrile rubbers, and polyurethanes.

11. The apparatus of claim 1 wherein the elastomeric form sheets are dipped in plasticiser to provide smooth durable surfaces thereon.

* * * * *